UNITED STATES PATENT OFFICE.

FRANK J. TONE, OF NIAGARA FALLS, NEW YORK, ASSIGNOR TO THE CARBORUNDUM COMPANY, OF NIAGARA FALLS, NEW YORK, A CORPORATION OF PENNSYLVANIA.

REFRACTORY ARTICLE AND PROCESS OF MAKING SAME.

1,362,274. Specification of Letters Patent. Patented Dec. 14, 1920.

No Drawing. Application filed February 24, 1920. Serial No. 360,842.

*To all whom it may concern:*

Be it known that I, FRANK J. TONE, a citizen of the United States, residing at Niagara Falls, in the county of Niagara and State of New York, have invented a new and useful Improvement in Refractory Articles and Processes of Making Same, of which the following is a full, clear, and exact description.

This invention relates to a new highly refractory material and process of making it.

This material consists of a mixture of zirconia and sillimanite in varying proportions which has been molded or formed into shaped articles by any of the well known methods and then burned at a high temperature.

I have discovered that mixtures of sillimanite and zirconia, when formed into refractory bodies and burnt, have very considerable resistance to cracking and spalling when subjected to sudden changes of temperature. They also possess marked chemical inactivity at high temperatures when in contact with certain corrosive and alkali slags.

Sillimanite in its pure state is a crystalline mineral consisting of silica and alumina in equal molecular proportions, and having the formula $Al_2O_3.SiO_2$. It rarely occurs in nature in commercial quantities, except mixed with or in combination with other minerals. I, therefore, prefer to use an artificial sillimanite produced by fusing a mixture of kaolin and alumina in the electric furnace. For this purpose I may use pure alumina or a high grade of bauxite, such as, for example, South American bauxite containing after calcination over 90% alumina, the impurities being principally silica, iron oxid and titanium oxid. If these two materials are combined in the proper proportion to give equal molecular proportions of silica and alumina and are then fused in an electric furnace without substantial reduction of the alumina and allowed to cool, there results a material consisting substantially of sillimanite and having the physical and chemical properties which well adapt it for the refractory material claimed herein. Another material containing sillimanite in large proportions and suitable for my process is made in accordance with the process described in my United States Patent No. 906,339. Mixtures of silica and alumina in proper proportions may also be combined to form sillimanite by burning the mixture in a high temperature oil or other combustion furnace.

The sillimanite material should be as free as possible from metallic impurities. I prefer to use the product in the crushed form, and have obtained good results from a "run of the crusher" product of No. 24 mesh and finer. For zirconia I prefer to use the product known as "zirkite cement" which consists of zirconium ore containing about 75% of zirconium oxid, ground down to a fine state of subdivision, but this may be replaced by other oxids or silicates of zirconium found in the trade.

A typical method in the practice of my invention is as follows:—I make a mixture of 90% of sillimanite or sillimanite-containing-material and 10% of zirconia. This mixture is molded into a brick or other shaped body of the form required, with or without a temporary binder, and is then burnt at a temperature of from 1400 to 1500 degrees in any kiln of suitable design. The resulting burnt articles are extremely hard and dense and possess a marked resistance against fracture.

The specifications above given may be modified very materially to produce articles most desirable for different applications. The relative proportions of sillimanite and zirconia may vary greatly and satisfactory products can be made containing from 5% to 75% and upward of zirconium. In certain cases it is desirable to introduce into the above mixture some coarser sillimanite material in order to lessen spalling. The zirconium content may consist of coarsely ground zirconium ore, purified zirconium oxid, or an electrically fused zirconium ore or oxid.

The material produced by my invention finds a wide application in the manufacture of bricks for the glass industry, the metal working industry, and other arts where high refractability or resistance to chemical action is required. It is also useful in the manufacture of crucibles, muffles and various furnace linings.

I claim:

1. As a new article of manufacture, a highly refractory material consisting essentially of a burnt mixture of zirconia and sillimanite.

2. As a new article of manufacture, a highly refractory material consisting essentially of a burnt mixture of zirconia and a material composed mainly of sillimanite.

3. As a new article of manufacture, a highly refractory material consisting principally of a burnt mixture containing 5% to 75% zirconia, and sillimanite.

4. As a new article of manufacture, a shaped refractory body consisting essentially of sillimanite, having a binder of zirconia.

5. The process of making highly refractory articles which consists in mixing zirconia and sillimanite, forming the mixture into shaped articles, and burning the shaped articles.

6. As a new article of manufacture, a highly refractory material consisting of a burned mixture of zirconium ore and sillimanite.

7. As a new article of manufacture, a highly refractory material consisting of a burned mixture of oxygen-containing compounds of zirconium and sillimanite.

8. The process of making highly refractory articles which consists in mixing zirconium ore and sillimanite, forming the mixture into shaped articles, and burning the shaped articles.

In testimony whereof I have hereunto set my hand.

FRANK J. TONE.